June 28, 1960   G. A. FRENCH   2,942,920
TRAY MOUNT
Filed March 16, 1956
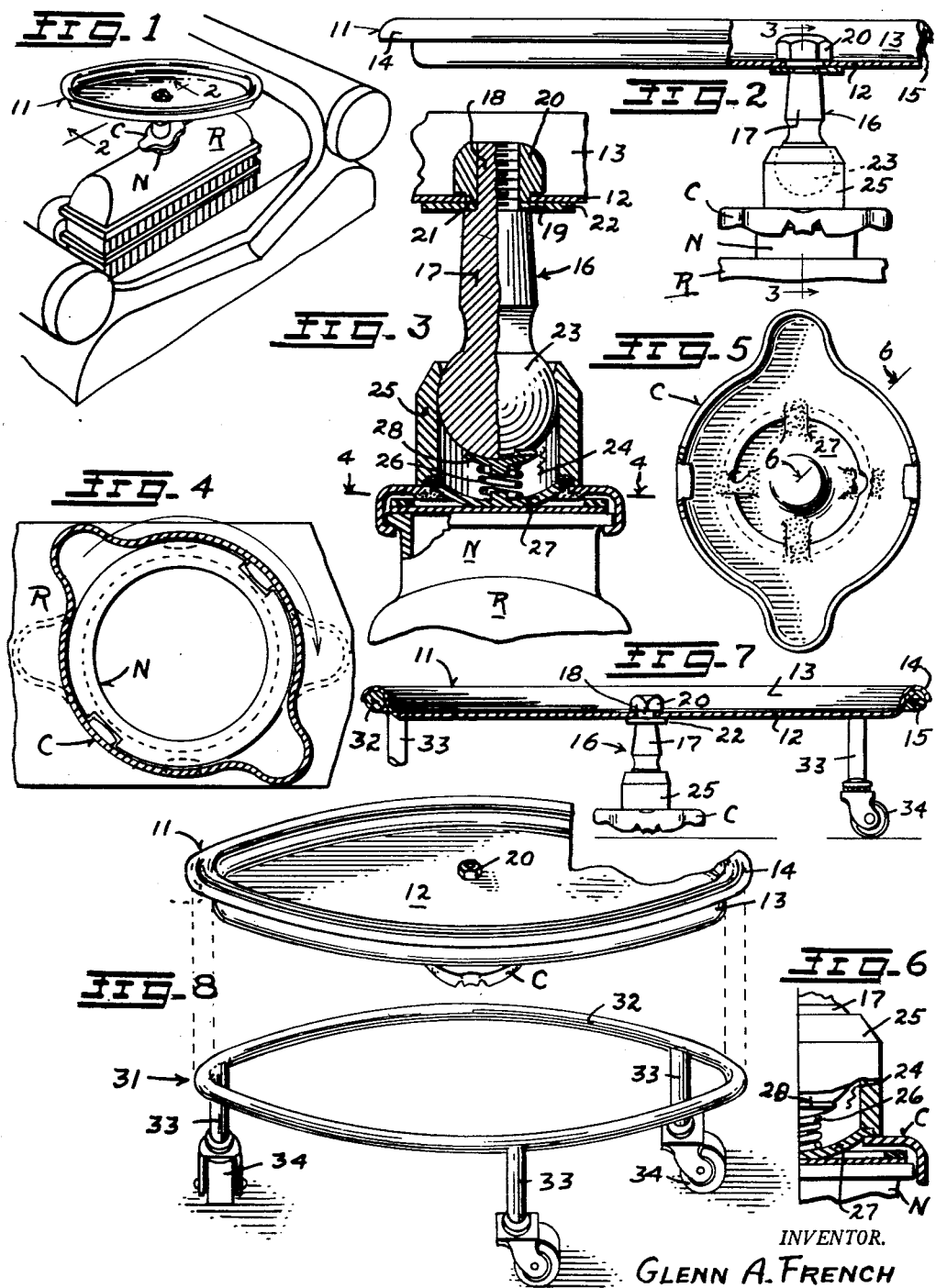
INVENTOR.
GLENN A. FRENCH
BY
Henry N. Young
ATTORNEY

United States Patent Office 2,942,920
Patented June 28, 1960

---

2,942,920

TRAY MOUNT

Glenn A. French, 510 Ramona Ave., Albany, Calif.

Filed Mar. 16, 1956, Ser. No. 572,138

2 Claims. (Cl. 311—21)

The invention relates to a device for adjustably mounting article-supporting trays, and more specifically to a mounting means for a tray which is designed to receive and support various articles in particularly accessible positions with reference to an automobile.

In making repairs or adjustments at and adjacent an engine of an automobile standing either in a repair shop or a garage or outdoors on the ground, a truly convenient support for tools and parts is usually lacking whereby tools or parts may be mislaid or lost with a consequent loss of time. For avoiding the foregoing and other inconveniences which may be encountered in connection with repairs or adjustments for automobile elements, a primary object of the present invention is to provide for a particularly ready and convenient temporary mounting of a tray to be used for supporting parts and tools or other articles on or adjacent an automobile.

A more specific object is to provide for the mounting of an article-supporting tray on a cap which fits the tubular filling nozzle for the radiator of an automobile engine in such a relation thereto that the tray is supported by and from the radiator as comprising the sole support therefor.

A further object is to provide a swivel mount for the tray to facilitate access to its different portions from a given position with respect to it.

An added object is to provide for a complete leveling adjustment of the mounted tray.

Yet another object is to provide a tray mounting means which is adapted for use on a base member which is directly and rollably supported by and upon the ground.

The invention possesses other objects and features of advantage, some of which, with the foregoing, will be set forth or be apparent in the following description of typical embodiments thereof, and in the accompanying drawings, in which, Figure 1 is a fragmentary perspective view showing a tray-mounting support unit of my invention as mounting a tray on the filling nozzle of an automobile engine radiator.

Figure 2 is an enlarged fragmentary and partly sectional view taken on the line 2—2 in Figure 1.

Figure 3 is an enlarged sectional view taken on the line 3—3 in Figure 2.

Figure 4 is a sectional view taken at the line 4—4 in Figure 3.

Figure 5 is an underneath view of a cap member of the tray-mounting assembly.

Figure 6 is a partly sectional fragmentary view taken at the line 6—6 in Figure 5.

Figure 7 is a view showing a tray provided with the present mounting means as independently mounted on a rollable base.

Figure 8 is a perspective view showing the tray unit and the support base of Figure 7 in axially separated relation.

The present mount for the support of various loose articles was primarily designed and adapted for use by a mechanic working on the engine of an automobile, whereby to facilitate the activities of the mechanic at and near the engine, it having been learned by experience that a tray mounted on the filler nozzle of the engine radiator is particularly useful for working at the top or sides of the engine while generally out of the way of the working mechanic. Accordingly, and as particularly illustrated in Figures 1 to 6 inclusive, a present tray-mounting means is shown as provided and utilized for mounting a tray 11 on the tubular filling nozzle tube N extending upwardly at the top of a usual radiator R of an automobile engine, and normally arranged for its sealed closing by a cap C having a usual connection of the fractional-thread type with the outside of the nozzle N. Noting that radiator caps C are generally standardized to have like structures and connections, the present mount utilizes a said cap C as the immediate attaching element of the assembly of a present tray-mounting means in the manner hereinafter brought out.

For its use and mounting in the indicated manner, the present tray 11 comprises a flat disc 12 of circular outline comprising the tray bottom and provided with an upstanding side 13 having its rim portion 14 comprising an outwardly extending flange formed to define a continuous inverted groove 15 of uniform and substantially semicircular cross section; as particularly disclosed, the tray may be shaped as a one-piece structure of suitably rigid sheet material of uniform thickness. At the geometrical center thereof, the disc portion 12 of the tray 11 is provided with a circular hole for use in mounting the disc on a supporting assembly 16 which is in turn mounted on a cap C or other element removably engaging and carried on or by a suitable support such as the illustrated filler tube N for the radiator R of an automobile engine.

It will now be noted that the present supporting assembly 16 essentially comprises a stem 17 having a swiveled connection with the tray bottom 12 at one end and a frictionally set universal joint connection with the screw cap C which is removably mountable in a usual manner on the top of the radiator filling nozzle N or of some other upstanding tubular element which it fits. As is particularly brought out in Figure 3, a reduced and threaded end portion 18 of the stem 17 extends from a flat annular shoulder 19 of the stem and engages freely through the preferably central tray disc hole which is somewhat larger than the threaded stem portion 18. While the portion 18 of the stem 17 extends through said disc opening, it is arranged to mount a nut 20 which is provided with an annular axial extension 21 which is arranged to closely engage the bore of the disc opening and extends from the nut end face thereat for a distance which very slightly exceeds the thickness of the disc 12 thereat. The arrangement is essentially such that a tightening of the nut on the stem end 18 to forcibly engage the free end of the nut extension 21 with a bearing washer 22 receiving the stem portion 18 and engaging the opposed stem shoulder 19 will provide for a free rotation of the tray about the extension stem in swiveled relation to the set nut and so about the stem axis thereat.

At the opposite end thereof from its threaded portion 18, the present stem 17 provides a spherical ball end 23 integral therewith and complementarily engaged and retained in the outer end portion of a cavity 24 of an externally cylindrical cup-like socket member 25 to provide a usual type of ball-and-socket universal joint thereat. The upper portion of the ball-receiving cavity 24 constantly encompasses and complementarily engages about an equatorial portion of the ball portion 23 of the stem 17 for retaining said ball therein, and the unoccupied inner portion of the cavity 24 provides a cylindrical recess for receiving an axially compressed helical spring 26 between its bottom 27 and a socket plate 28 complementarily engaging the ball 23. The universal ball-joint connection thus provided is essentially such that the spring 28 functions to provide such a degree of friction between the mutually engaged ball and socket portions of the connection that the stem 17 may be normally set and held in angularly adjusted relation to the socket member 25, whereby to carry the rotatable disc 12 in angularly adjusted relation to the axis of the supporting screw-cap C which is suitably and coaxially fixed to the member 25.

The cap C is particularly shown in Figures 1 to 4 and 6 as mounted on the tubular filling nozzle or tube N of the radiator R of an automobile engine with which the present tray 11 and its mounting have been designed for use, said radiator and automobile then generally constituting a movable support base for the tray which, by reason of its swiveled mounting on the stem 17, may be rotatively adjusted as desired for the selective placement and removal of articles with respect to it, and may be adjusted to or from a horizontal position independently of the position of the mounting automobile on a sloping or level support surface therefor. Understanding, however, that a present unitary tray-and-stem-and-cap assembly may be mounted and carried upon any upright tubular element which is arranged to mount the cap at its top in removably fixed relation to it, it will be noted that the cap C of a present assembly 11—16 might fittedly engage a tubular member provided by any suitable base having an upstanding mounting tube N to provide for the disposal of the tray directly on the floor beneath an automobile engine or other part on which a mechanic is working from below, such a base conveniently being rollable over and notchable upon the support surface engaged by it.

In lieu of utilizing the described stem-and-cap assembly to support a tray 11 to which it is attached, another tray supporting means might be provided and utilized. Thus, as shown in Figures 7 and 8, a rollable carriage 31 is provided having a planar and circular top ring 32 supported on three integrally depending legs 33 carried by caster rollers 34 in a tripod support arrangement, with the ring 32 arranged for engagement in the groove 15 of the tray rim 14 for directly supporting the tray on the carriage. Preferably, and as shown, the ring 32 is so spaced above the plane of support provided by the rollers 34 of the carriage 31 that the supporting assembly 16 may remain attached to the tray while the tray is mounted on the carriage; in this manner, the present unitary tray and stem assembly may be most readily mounted and utilized in different locations with respect to an automobile or other mechanism to be worked on.

While the present arrangement has been particularly designed for positioning a tray for supporting parts and tools and other articles within convenient reach of a mechanic working on automobile parts, it will be understood that a tray provided with a present mounting stem therefor may be utilized for other purposes, such as to provide a suitably located support for food or cosmetics or other articles at a given mounting point within convenient reach. Furthermore, it will be understood that another support base providing an upstanding tubular element corresponding to the nozzle N might be provided in lieu of the radiator R of Figures 1 to 6 or the carriage 31 of Figures 7 and 8 for supporting a tray thereon by the use of the cap C of the mounting assembly to engage a cap-mounting tubular element provided by the base, and that such an alternative arrangement would fall within the scope of the disclosure of Figures 1 to 6.

From the foregoing description taken in connection with the accompanying drawings, the advantages of the disclosed tray-mounting means will be readily understood by those skilled in the art to which the invention appertains. While I have shown and described arrangements which I now consider to be a preferred embodiment of my invention, I desire to have it understood that the disclosure is primarily illustrative, and that such changes and developments may be made, when desired, as fall within the scope of the following claims.

I claim:
1. In combination with a flat-bottomed tool tray or the like and an upright support element removably mounting a cap providing a ball-receiving socket, means unitarily attaching said tray to said cap and comprising an elongated tray-carrying stem arranged for its upright disposal and having a ball at its lower end seatably engaged in said socket, a means connecting the tray bottom to the upper end of said stem for a free rotation of said tray bottom in a plane perpendicular to the stem axis, and a spring means yieldingly seating said ball in said socket to provide a solely frictionally set ball-and-socket connection between the stem and cap providing for a leveling adjustment of the stem-carried said tray on the support element.

2. In combination with a tool tray or the like and a support element providing an upwardly-directed ball-receiving socket, means unitarily attaching said tray to said support element and comprising an elongated tray-carrying stem arranged for its upright disposal and having a ball at its lower end seatably engaged in said element socket, a means connecting the tray bottom to the upper end of said stem for a free rotation of said tray in a plane perpendicular to the stem axis, and a spring means yieldingly cooperative between said ball and said socket for seating the ball in the socket in a solely frictionally set relation thereto to provide for a leveling adjustment of the stem-carried said tray on said element.

References Cited in the file of this patent

UNITED STATES PATENTS

| | | |
|---|---|---|
| 420,968 | Seaman | Feb. 11, 1890 |
| 538,534 | O'Neill | Apr. 30, 1895 |
| 807,857 | Palmemberg | Dec. 19, 1905 |
| 1,449,204 | Viehmann | Mar. 20, 1923 |
| 1,569,096 | Long | Jan. 12, 1926 |
| 1,573,910 | Brinkman | Feb. 23, 1926 |
| 1,598,544 | Tanquary | Aug. 31, 1926 |
| 1,978,577 | Harris | Oct. 30, 1934 |
| 2,195,366 | Haigh | Mar. 26, 1940 |
| 2,736,580 | Boetcker | Feb. 28, 1956 |
| 2,805,778 | Yordi | Sept. 10, 1957 |